(12) United States Patent
Tanaka

(10) Patent No.: US 12,102,108 B2
(45) Date of Patent: *Oct. 1, 2024

(54) INGREDIENT CONTROL METHOD AND INGREDIENT CONTROL DEVICE

(71) Applicant: Evertron Holdings PTE. LTD., Singapore (SG)

(72) Inventor: Hisao Tanaka, Tokyo (JP)

(73) Assignee: EVERTRON HOLDINGS PTE. LTD., Singapore (SG)

( * ) Notice: Subject to any disclaimer, the term of this patent is extended or adjusted under 35 U.S.C. 154(b) by 563 days.

This patent is subject to a terminal disclaimer.

(21) Appl. No.: 16/053,739

(22) Filed: Aug. 2, 2018

(65) Prior Publication Data

US 2019/0038077 A1    Feb. 7, 2019

(30) Foreign Application Priority Data

Aug. 3, 2017   (JP) .................. 2017-151155

(51) Int. Cl.
  *A23L 5/10*   (2016.01)
  *A23L 5/30*   (2016.01)
  *A47J 37/12*  (2006.01)

(52) U.S. Cl.
  CPC . *A23L 5/15* (2016.08); *A23L 5/11* (2016.08); *A23L 5/30* (2016.08); *A47J 37/1257* (2013.01);
  (Continued)

(58) Field of Classification Search
  CPC ............... A47J 37/1266; A47J 37/1257; A47J 37/1271; A23L 5/30; A23L 5/11; A23V 2002/00; C10G 33/02
  (Continued)

(56) References Cited

U.S. PATENT DOCUMENTS 6,193,878 B1   2/2001   Morse et al.
7,654,196 B2   2/2010   Uchikawa et al.
(Continued)

FOREIGN PATENT DOCUMENTS

CN   204698314 U   10/2015
EA     009630 B1    2/2008
(Continued)

OTHER PUBLICATIONS

Machine translation of JP2016-129672A (Year: 2016).*
(Continued)

*Primary Examiner* — Nicholas A Smith
(74) *Attorney, Agent, or Firm* — MASUVALLEY & PARTNERS; Peter Martinez

(57) ABSTRACT

Food containing water is improved. A fryer controls water which is an ingredient of food as an object placed between a pair of opposed plate antennas, to be more specific, the water activity of the object, by generating electromagnetic waves between the pair of opposed plate antennas. Then, the fryer applies a DC electric field of +100 V as an offset electric field on the water phase side relative to the oil phase in an AC electric field to irradiate food with electromagnetic waves at a frequency of 50 kHz. Thus, the interfacial polarization between the water phase and the oil phase can be increased to decrease the interfacial tension between the water phase and the oil phase by approximately 60% and bind water in a pearl-chain structure, thus decreasing the water activity.

7 Claims, 11 Drawing Sheets

Phosphate-Buffered Saline(pH7.2 ~ 7.4)

| $V_{pp}$/cm | 50Hz | 100Hz | 500Hz | 1kHz | 5kHz | 10kHz | 50kHz | 100kHz |
|---|---|---|---|---|---|---|---|---|
| 0 | × | × | × | × | × | × | × | × |
| 200 | △ | △ | △ | △ | △ | △ | △ | × |
| 500 | O/− | O/− | O | O | O | O | O | O |
| 1000 | − | − | O/− | O/− | O/− | O | O | O |
| 2000 | − | − | − | − | − | − | − | O |

(52) U.S. Cl.
CPC ....... *A47J 37/1266* (2013.01); *A47J 37/1271* (2013.01); *A23V 2002/00* (2013.01)

(58) Field of Classification Search
USPC .................. 422/186–187; 204/157.5, 157.52
See application file for complete search history.

(56) References Cited

U.S. PATENT DOCUMENTS

| | | | |
|---|---|---|---|
| 10,757,960 | B2 | 9/2020 | Tanaka |
| 2003/0205571 | A1 | 11/2003 | Flugstad et al. |
| 2006/0112699 | A1 | 6/2006 | Sato et al. |
| 2007/0254080 | A1 | 11/2007 | Schackmuth et al. |
| 2009/0199570 | A1 | 8/2009 | Fujisaki et al. |
| 2009/0252842 | A1 | 10/2009 | Wang et al. |
| 2014/0064712 | A1 | 3/2014 | Grega |
| 2014/0287150 | A1* | 9/2014 | Miljkovic ............ B01D 5/0042 427/458 |
| 2015/0237683 | A1 | 8/2015 | Polato et al. |
| 2016/0015076 | A1 | 6/2016 | Kametaka et al. |
| 2016/0350715 | A1 | 12/2016 | Minvielle |
| 2017/0055774 | A1 | 3/2017 | Grimaldi et al. |
| 2019/0038077 | A1 | 2/2019 | Tanaka |
| 2019/0038998 | A1* | 2/2019 | Leitner ................. B01D 17/06 |
| 2019/0364933 | A1 | 12/2019 | Jung |
| 2020/0329742 | A1 | 10/2020 | Tanaka |

FOREIGN PATENT DOCUMENTS

| | | | | |
|---|---|---|---|---|
| GB | 2506905 | A | 4/2014 | |
| JP | S48-23044 | A | 3/1973 | |
| JP | 51-037271 | B1 | 10/1976 | |
| JP | H01-160472 | A | 6/1989 | |
| JP | H04-260751 | A | 9/1992 | |
| JP | H06-230325 | A | 8/1994 | |
| JP | H07-155154 | A | 6/1995 | |
| JP | 2002-136430 | A | 5/2002 | |
| JP | 2002-204754 | A | 7/2002 | |
| JP | 2003-343961 | A | 12/2003 | |
| JP | 2004-041531 | A | 2/2004 | |
| JP | H11-113761 | A | 5/2004 | |
| JP | 2006-102447 | A | 4/2006 | |
| JP | 2007-082678 | A | 4/2007 | |
| JP | 2015-027443 | A | 2/2015 | |
| JP | 5727104 | B1 | 6/2015 | |
| JP | 2016-112205 | A | 6/2016 | |
| JP | 2016-129672 | A | 7/2016 | |
| JP | 2017-012684 | A | 1/2017 | |
| JP | 6095087 | B1 | 3/2017 | |
| KR | 20160032952 | A * | 3/2016 | .......... A47J 37/1266 |
| KR | 10-20170086129 | A | 7/2017 | |
| KR | 10-2071529 | B1 | 1/2020 | |
| SU | 1324629 | A1 | 7/1987 | |
| WO | WO2005013730 | A1 | 2/2005 | |
| WO | WO2006054348 | A1 | 5/2006 | |
| WO | WO2008117341 | A1 | 10/2008 | |
| WO | WO2014208658 | A1 | 12/2014 | |
| WO | WO2015122070 | A1 | 8/2015 | |
| WO | WO2017179752 | A1 | 10/2017 | |
| WO | WO2017183586 | A1 | 10/2017 | |
| WO | WO 2019/132046 | A1 | 7/2019 | |

OTHER PUBLICATIONS

Misono, T. (2019). Interfacial Tension Between Water and Oil. In: Abe, M. (eds) Measurement Techniques and Practices of Colloid and Interface Phenomena. Springer, Singapore. https://doi.org/10.1007/978-981-13-5931-6_6 (Year: 2019).* https://evertron.jp/foodasset/?lang=ja (Year: 2023).*

Nishimura, Satoshi et al., "Electrocapillary Phenomena at Edible Oil/Saline Interfaces," *Journal of Oleo Science*, vol. 66, No. 3, Mar. 1, 2017, pp. 235-249, 15 pages.

KIPO, Grant of Patent mailed on Oct. 21, 2019 in Korean Application No. 10-2018-0016902, 2 pages with English Translation.

KIPO, Notice of Final Rejection mailed on Jun. 28, 2019 issued in Korean Application No. 10-2018-0016902, Total 6 pages with English Translation.

CNIPA, Chinese Office Action issued on Jun. 6, 2022 in Chinese Application No. 201880058728.6, 24 pages with English translation.

Zhang Jian, Oilfield Mine Separation Technology and Equipment, Chinese Version Library CIP Data Core Word (2011) No. 252558, Dec. 2010, pp. 246-253, China University of Petroleum Press, China with English translation.

TV Tokyo Corporation, "Freshness is life! Amazing technology!", Oct. 24, 2017, Dawn of Gaia, URL; https://www.ty-tokyo.co.jp/gaia/backnumber4/preview 20171024.html. Japan, 6pp.

TV Tokyo Corporation, "Freshness is life! Amazing technology!(2)", Oct. 24, 2017, Dawn of Gaia, URL; https://lovely--lovely-net.translate.goog/business/evertron/?_x_tr_sl=ja&_x_tr_tl=en&-_x_tr_hl=en&_x_tr_pto=sc, Japan, 108pp.

Encyclopaedia Britannica, Inc. "Supersonic flight," Britannica Academic, Encyclopaedia Britanica, Jul. 21, 2015, Published on Jul. 27, 2018, academic.eb.com/levels/collegiate/article/supersonic-flight/70404. Accessed Dec. 4, 2020 (Year: 2015).

Michael Von Domaros et al., "Supporting information for: Dynamics at a Janus interface", The Journal of Physical Chemistry C, vol. 117, No. 9, Mar. 7, 2013, pp. 4561-4567, 10pp.

Liu Kejian et al., Beling Institute of Technology Press "Practical training in electronic skills", Journal published on Nov. 30, 2015, p. 135-136, ISBN 978-7-5682-0995-3, 4pages.

United States Patent and Trademark Office, US Final Office Action issued on Jun. 28, 2023 in U.S. Appl. No. 15/893,060, 31 pages.

Japan Patent Office, Japanese Office Action mailed on Aug. 8, 2023 in Japanese Application No. 2023-092435, 6 pages with English translation 7 pages.

Korean Intellectual Property Office, Korean Office Action issued on Mar. 28, 2023 in Korean Application No. 10-2018-0016338, 8 pages.

Brazilian Patent and Trademark Office, Brazilian Office Action issued on May 25, 2023 in Brazilian Application No. 112020012941-0, 5 pages.

* cited by examiner

| E,V_pp/cm (50kHz, 0V_offset) | Harvest Oil | | Harvest Oil / Sodium Oleate | |
|---|---|---|---|---|
| | pH7.2~7.4 Phosphate-Buffered Saline | pH5.4~5.6 Saline | pH7.2~7.4 Phosphate-Buffered Saline | pH5.4~5.6 Saline |
| 0 | X | X | X | X |
| 200 | X | X | △ | △ |
| 500 | X | X | ○ | ○ |
| 1000 | X | X | ○ | ○ |
| 2000 | X | X | — | — |

○ Formation of Pearl Chaines    X Not Changed

△ Response to Electric Field    — Unobservable due to Flow Generation

Phosphate-Buffered Saline(pH7.2 ~ 7.4)

| $V_{pp}$/cm | 50Hz | 100Hz | 500Hz | 1kHz | 5kHz | 10kHz | 50kHz | 100kHz |
|---|---|---|---|---|---|---|---|---|
| 0 | × | × | × | × | × | × | × | × |
| 200 | × | × | × | × | × | × | × | × |
| 500 | × | × | × | × | × | × | × | × |
| 1000 | × | × | × | × | × | × | × | × |
| 2000 | × | × | × | × | × | × | × | × |

Saline (pH5.4 ~ 5.6)

| $V_{pp}$/cm | 50Hz | 100Hz | 500Hz | 1kHz | 5kHz | 10kHz | 50kHz | 100kHz |
|---|---|---|---|---|---|---|---|---|
| 0 | × | × | × | × | × | × | × | × |
| 200 | × | × | × | × | × | × | × | × |
| 500 | × | × | × | × | × | × | × | × |
| 1000 | × | × | × | × | × | × | × | × |
| 2000 | × | × | × | × | × | × | × | × |

○ Formation of Pearl Chaines  × Not Changed
△ Response to Electric Field  — Unobservable due to Flow Generation

FIG. 18A  Phosphate-Buffered Saline(pH7.2 ~ 7.4)

| $V_{pp}$/cm | 50Hz | 100Hz | 500Hz | 1kHz | 5kHz | 10kHz | 50kHz | 100kHz |
|---|---|---|---|---|---|---|---|---|
| 0 | × | × | × | × | × | × | × | × |
| 200 | △ | △ | △ | △ | △ | △ | △ | × |
| 500 | ○/— | ○/— | ○ | ○ | ○ | ○ | ○ | ○ |
| 1000 | — | — | ○/— | ○/— | ○/— | ○ | ○ | ○ |
| 2000 | — | — | — | — | — | — | — | ○ |

FIG. 18B  Saline (pH5.4 ~ 5.6)

| $V_{pp}$/cm | 50Hz | 100Hz | 500Hz | 1kHz | 5kHz | 10kHz | 50kHz | 100kHz |
|---|---|---|---|---|---|---|---|---|
| 0 | × | × | × | × | × | × | × | × |
| 200 | △ | △ | △ | △ | △ | △ | △ | × |
| 500 | ○ | ○ | ○ | ○ | ○ | ○ | ○ | ○ |
| 1000 | — | — | — | ○/— | ○/— | ○ | ○ | ○ |
| 2000 | — | — | — | — | — | — | — | ○ |

○ Formation of Pearl Chaines   × Not Changed
△ Response to Electric Field   — Unobservable due to Flow Generation

INGREDIENT CONTROL METHOD AND INGREDIENT CONTROL DEVICE

RELATED APPLICATIONS

This application claims priority to Japanese Patent Application No. 2017-151155 filed on Aug. 3, 2017, the entire contents of which are incorporated herein by reference.

TECHNICAL FIELD

The present invention relates to ingredient control methods and ingredient control devices and particularly relates to an ingredient control method and an ingredient control device that can improve an object containing an ingredient.

BACKGROUND

There is known a fryer by means of which food is cooked in a space where electromagnetic waves in a predetermined frequency range generate, so that the eating quality of the cooked food can be made very high (see Patent Literature 1: JP-A-2016-129672). The entire contents of Patent Literature 1 are incorporated herein by reference. According to Patent Literature 1, it is described that when food is cooked in a space where electromagnetic waves in the predetermined frequency range generate, good effects, including prevention of food oil oxidation and degradation and improvement of the eating quality of cooked food, can be obtained.

CITATION LIST

Patent Literature

Literature 1: JP-A-2016-129672

OBJECTS AND SUMMARY OF THE INVENTION

Technical Problem

However, at the time when the fryer and the cooking method both according to Patent Literature 1 were invented, even the inventor did not quite understand reasons why the above good effects were obtained, and therefore the above technique could not be applied to all kinds of food and had difficulty being applied to things other than food.

The present invention has been made to solve the above problem and therefore has an objective of providing an ingredient control method and an ingredient control device that can improve an object containing an ingredient.

Solution to Problem

To attain the above objective, an ingredient control method according to a first aspect of the present invention is an ingredient control method using an ingredient control device including a pair of vibration generating portions capable of generating vibrations and includes generating vibrations between the pair of vibration generating portions to control an ingredient in an object placed between the pair of vibration generating portions.

In the above ingredient control method, the vibration generating portions may be electrodes capable of generating electromagnetic waves and a water activity of the object may be controlled by generating electromagnetic waves between the electrodes.

In the above ingredient control method, the vibration generating portions may generate electromagnetic waves between the electrodes to increase interfacial polarization between a water phase of the object and another phase and thus decrease an interfacial tension between the water phase and the other phase and bind water in the object into a pearl-chain structure.

In the above ingredient control method, a DC electric field may be applied as an offset electric field in an AC electric field to increase the interfacial polarization between the water phase of the object and the other phase and thus decrease the interfacial tension between the water phase and the other phase and bind the water in the object into a pearl-chain structure.

In the above ingredient control method, the DC electric field of approximately +100 V may be applied as an offset electric field on the water phase side relative to the other phase in the AC electric field to increase the interfacial polarization between the water phase of the object and the other phase and thus decrease the interfacial tension between the water phase and the other phase and bind the water in the object into a pearl-chain structure.

In the above ingredient control method, the electromagnetic waves preferably have a frequency of approximately 10 kHz to approximately 500 kHz.

In the above ingredient control method, the electromagnetic waves are preferably low-frequency waves.

In the above ingredient control method, the water in the object may be divided into bound water and free water and the free water in the object may be bound in a pearl-chain structure.

To attain the above objective, an ingredient control device according to a second aspect of the present invention includes a pair of vibration generating portions capable of generating vibrations and controls an ingredient in an object placed between the pair of vibration generating portions by the vibrations generated between the pair of vibration generating portions.

Advantageous Effects of Invention

The ingredient control method and ingredient control device both according to the present invention can improve an object containing an ingredient.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which

FIG. 18A is a table showing observation results of water microdroplets of phosphate-buffered saline to which various AC electric fields were applied in sodium oleate-added food oil and FIG. 18B is a table showing observation results of water microdroplets of saline under the same conditions.

DESCRIPTION OF EMBODIMENTS

Hereinafter, the present invention will be described with reference to the drawings. The present invention is not at all limited by the descriptions of the specification and drawings and various modifications and variations thereof can be appropriately made without changing the gist of the invention.

A fryer according to this embodiment is formed of, for example, an electric field-applicable fryer by means of which food can be cooked in a space where electromagnetic waves in a predetermined frequency range generate, and controls water contained in the food.

Figure 1:
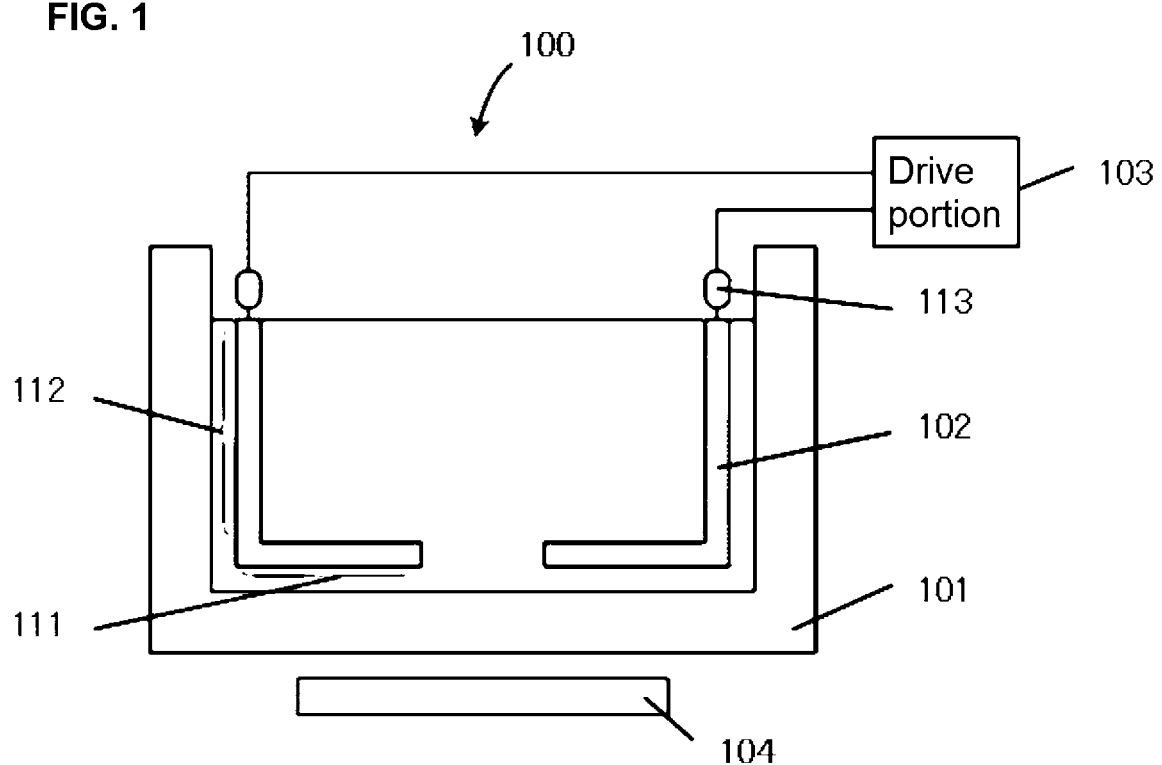
FIG. 1 is a side view schematically showing a fryer according to an embodiment.

FIG. 1 is a side view schematically showing a fryer 100 according to an embodiment. The fryer 100 essentially includes an oil reservoir 101, a pair of opposed plate antennas 102, a drive portion 103, and a heating portion 104.

The oil reservoir 101 is provided for the purpose of storing food oil therein and cooking food therein. In other words, food is fried by putting the food into the heated food oil in the oil reservoir 101. The oil reservoir 101 is where food is to be put in and the internal surface of the oil reservoir 101 thus comes into contact with hot oil. Therefore, the oil reservoir 101 is preferably made of a material harmless to humans and less degradable even after a long period of use at high temperatures, for example, stainless steel. The volume and shape of the oil reservoir 101 are arbitrarily selected depending on where the fryer 100 is to be placed, how much food is to be cooked at once by the fryer 100, and/or other requirements.

The pair of opposed plate antennas 102 are placed oppositely and upright in the oil reservoir 101. While electromagnetic waves in a predetermined frequency range are generated between the opposed plate antennas 102, food is cooked in the space where the electromagnetic waves generate. The surfaces of the opposed plate antennas 102 are preferably coated with an insulating material. Through the use of this structure, for example, it can be prevented that an AC voltage supplied to the opposed plate antennas 102 is transmitted to the oil reservoir 101 to shock the user of the fryer 100 and cause failures or the like of devices around the fryer 100.

For example, the opposed plate antennas 102 may each have an approximately L-shaped cross-section, may be each composed of a base portion 111 approximately parallel to the bottom surface of the oil reservoir 101 and a vertical portion 112 approximately perpendicular to the bottom surface of the oil reservoir 101, and may be placed upright with the ends of the base portions 111 facing each other. As seen from the above description of "approximately L-shaped", instead of the configuration where the base portion 111 and the vertical portion 112 are joined at a right angle to form the plate antenna 102 in an L-shape, for example, the plate antenna 102 may be configured so that the cross section of the joint between the base portion 111 and the vertical portion 112 has a round, R-shape.

Furthermore, the base portion 111 and/or the vertical portion 112 of the plate antenna 102 may have multiple holes. The shape of the holes are arbitrary, for example, circular, triangle, rectangle, pentagonal or hexagonal. The size and arrangement of the holes are also arbitrary.

The drive portion 103 is provided for the purpose of driving the opposed plate antennas 102 to generate electromagnetic waves (radio waves) having a frequency of approximately 10 kHz to approximately 500 kHz between the opposed plate antennas 102. The electromagnetic waves formed between the opposed plate antennas 102 are preferably low-frequency waves having a frequency of 30 kHz to 300 kHz and more preferably 50 kHz to 100 kHz. To form electromagnetic waves in a predetermined frequency range between the opposed plate antennas 102, for example, it is conceivable to connect to the opposed plate antennas 102 an oscillator for generating electromagnetic waves of a predetermined frequency. In this case, the drive portion 103 may be electrically connected through terminals 113 to the opposed plate antennas 102.

The heating portion 104 is provided for the purpose of heating food oil stored in the oil reservoir 101 to 120° C. to 200° C. to cook food. Various methods can be used as the heating method and examples include: a heating method in which a heating coil is housed in a metal pipe and an electric current is passed through the heating coil to generate heat; and a heating method of combusting a gas to generate heat. Although in this embodiment the heating portion 104 is provided outside of the oil reservoir 101, the heating portion 104 may be provided in the oil reservoir 101 or integrally formed with the oil reservoir 101.

Figure 2:
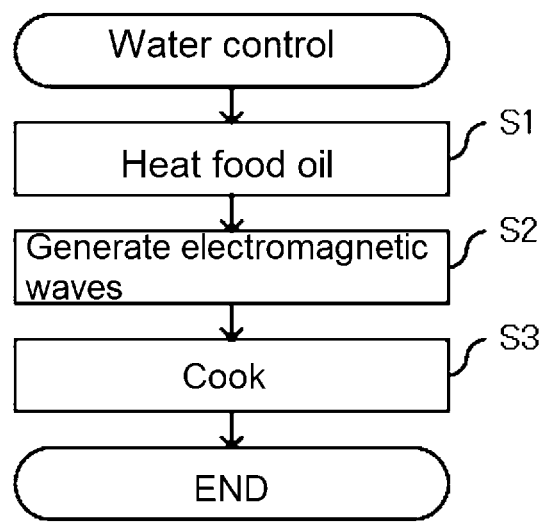
FIG. 2 shows an example of a processing flow in a water control method using the fryer according to the above embodiment.

FIG. 2 shows an example of a processing flow in a water control method (ingredient control method) using the fryer according to this embodiment. In the cooking method shown in FIG. 2, first, the heating portion 104 of the fryer 100 heats food oil in the oil reservoir 101 to a temperature range of 120° C. to 200° C. (step S1). Next, the drive portion 103 of the fryer 100 drives the opposed plate antennas 102 to generate electromagnetic waves having a frequency of 50 kHz to 100 kHz in the food oil being heated by the heating portion 104 (step S2). Then, when food to be cooked is put in the food oil, the fryer 100 cooks the food while controlling water contained in the food in the space where electromagnetic waves in the predetermined frequency range generate (step S3). When the cooking is finished, the food is picked up from the food oil.

EXAMPLE 1

Generally, when food is cooked, water contained in the food turns into water vapor in food oil, so that bumping occurs. In the water control method according to this embodiment, the interfacial tension at the oil-water interface can be decreased by generating electromagnetic waves in the predetermined frequency range. Thus, the water contained in the food is likely to be desorbed from the food and dispersed in the form of water droplets in the food oil. Therefore, even if the water turns into vapor and gasifies in the heated food oil, only minor bumping occurs. By controlling water contained in food in this manner to reduce bumping, good effects, including prevention of oil penetration into the food, can be obtained. Coupled with this, the cooked food has very good eating quality.

To verify the reduction of bumping by the water control method according to this embodiment, an AC electric field in a frequency range of 50 kHz to 100 kHz and/or a DC electric field was applied to measure the interfacial tension at the oil-water interface at room temperature (20° C. to 25° C.) (Example 1). In this case, the interfacial tension is defined as work (energy) necessary to extend the oil-water interface by 1 m$^2$ and measured by the sessile drop method. In the sessile drop method, the magnitude of the interfacial tension corresponds to the volume (weight) of a water droplet falling from a capillary tube.

In this example, harvest oil was used as the food oil. Furthermore, because the pH of food (such as fish, meat, and vegetables) to be cooked is within a range of 5 to 7, phosphate-buffered saline with a pH of 7.2 to 7.4 and saline with a pH of 5.4 to 5.6 were used as model aqueous solutions for water contained in food.

Measurement of Interfacial Tension in Fresh Food Oil

First, measurement was made of the interfacial tension when an AC electric field of 200 Vpp at 50 kHz was applied to additive-free fresh food oil with phosphate-buffered saline of pH 7.2 to 7.4 as a water phase, and the interfacial tension when a DC electric field of ±100 V was further applied as an offset electric field on the water phase side relative to the oil phase in the above AC electric field.

Figure 3A:
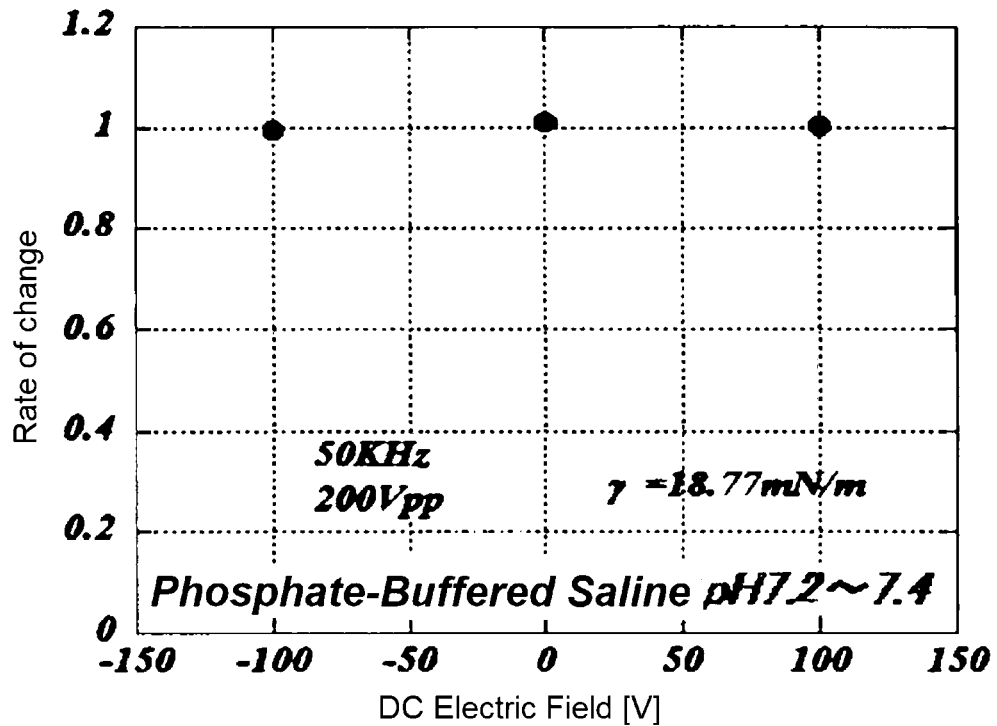
FIG. 3A is a graph showing measurement results of interfacial tension when an electric field was applied to additive-free fresh food oil with phosphate-buffered saline as a water phase and FIG. 3B is a graph showing measurement results of interfacial tension when an electric field was applied to additive-free fresh food oil with saline as a water phase.

FIG. 3A is a graph showing measurement results of interfacial tension when an electric field was applied to additive-free fresh food oil with phosphate-buffered saline as a water phase. The abscissa axis of the graph in FIG. 3A represents the DC electric field [V] applied as an offset electric field, while the ordinate axis represents the rate of change of the interfacial tension due to the application of the electric field.

As shown in FIG. 3A, in the case where phosphate-buffered saline was used as a water phase and fresh food oil was free from additive, there was substantially no change in interfacial tension found due to the application of the electric field.

Next, because a thermolysate or hydrolysate of the food oil may have been produced, $10^{-3}$ M (=mol/l) oleic acid or an oleic compound, such as $10^{-3}$ M sodium oleate, which are model substances of the thermolysate or hydrolysate, was added to the fresh food oil and measurement was made of the interfacial tension when an AC electric field of 200 Vpp at 50 kHz was applied to the additive-contained food oil with the water phase and the interfacial tension when a DC electric field of ±100 V was further applied as an offset electric field in the above AC electric field.

Figure 4A:
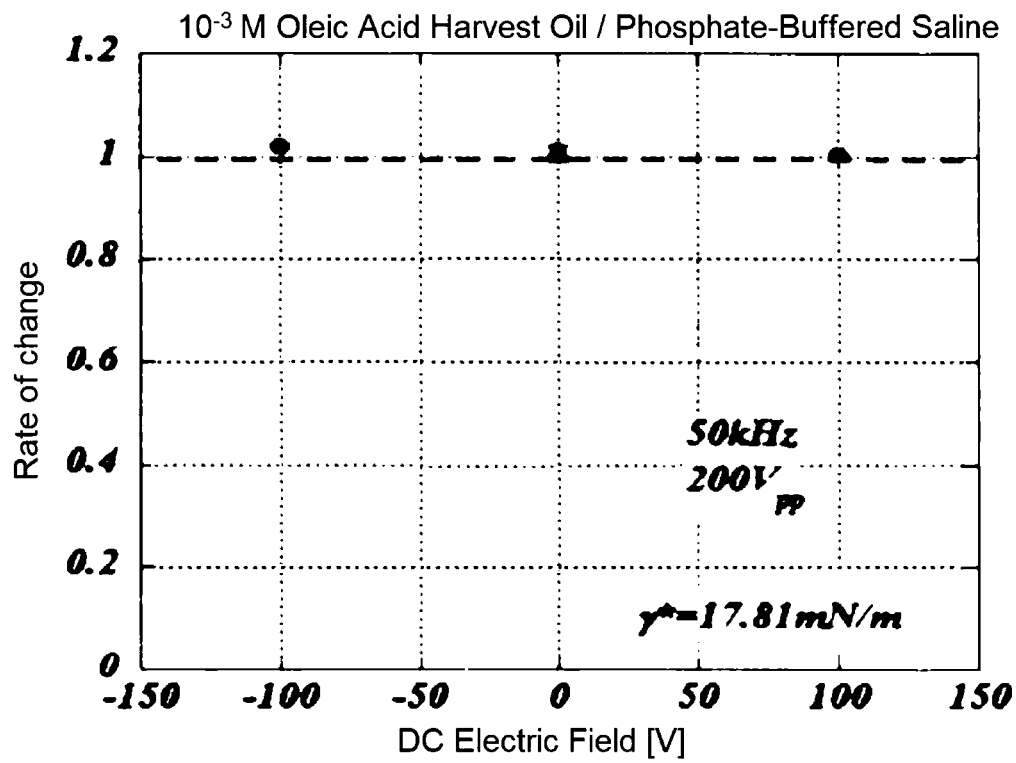
FIG. 4A is a graph showing measurement results of interfacial tension when an electric field was applied to oleic acid-added food oil with phosphate-buffered saline as a water phase and FIG. 4B is a graph showing measurement results of interfacial tension when an electric field was applied to sodium oleate-added food oil with phosphate-buffered saline as a water phase.
Figure 4B:
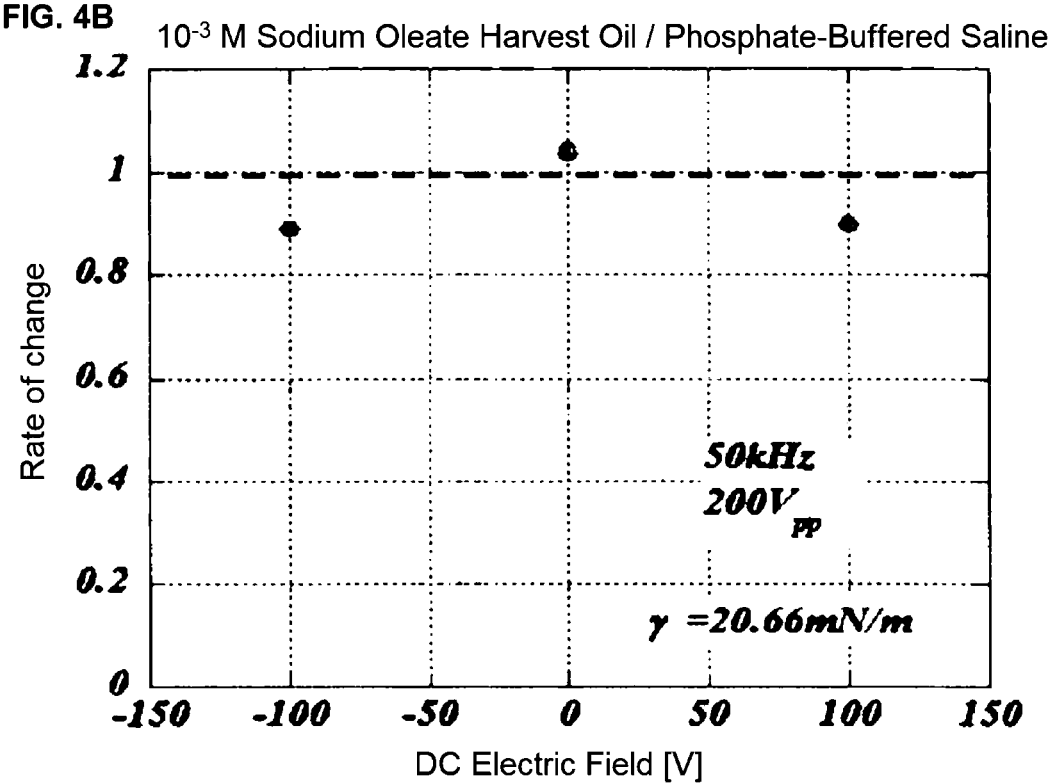

FIG. 4A is a graph showing measurement results of interfacial tension when an electric field was applied to oleic acid-added food oil with phosphate-buffered saline as a water phase and FIG. 4B is a graph showing measurement results of interfacial tension when an electric field was applied to sodium oleate-added food oil with phosphate-buffered saline as a water phase. Like the graph shown in FIG. 3A, the abscissa axes of the graphs in FIGS. 4A and 4B represent the DC electric field [V] applied as an offset electric field, while the ordinate axes represent the rate of change of the interfacial tension due to the application of the electric field.

As shown in FIG. 4A, even in the case where $10^{-3}$ M oleic acid was added to fresh food oil, there was substantially no change in interfacial tension found due to the application of the electric field. On the other hand, as shown in FIG. 4B, in the case where $10^{-3}$ M sodium oleate was added to fresh food oil, there was substantially no change found in interfacial tension when only an AC electric field was applied, but a decrease in interfacial tension was confirmed when a DC electric field of ±100 V was further applied as an offset electric field in the AC electric field.

As shown in FIG. 3A, in the case where phosphate-buffered saline was used as a water phase and $10^{-3}$ M sodium oleate was added to fresh food oil, measurement was made of interfacial tensions when various electric fields were applied.

Figure 5:
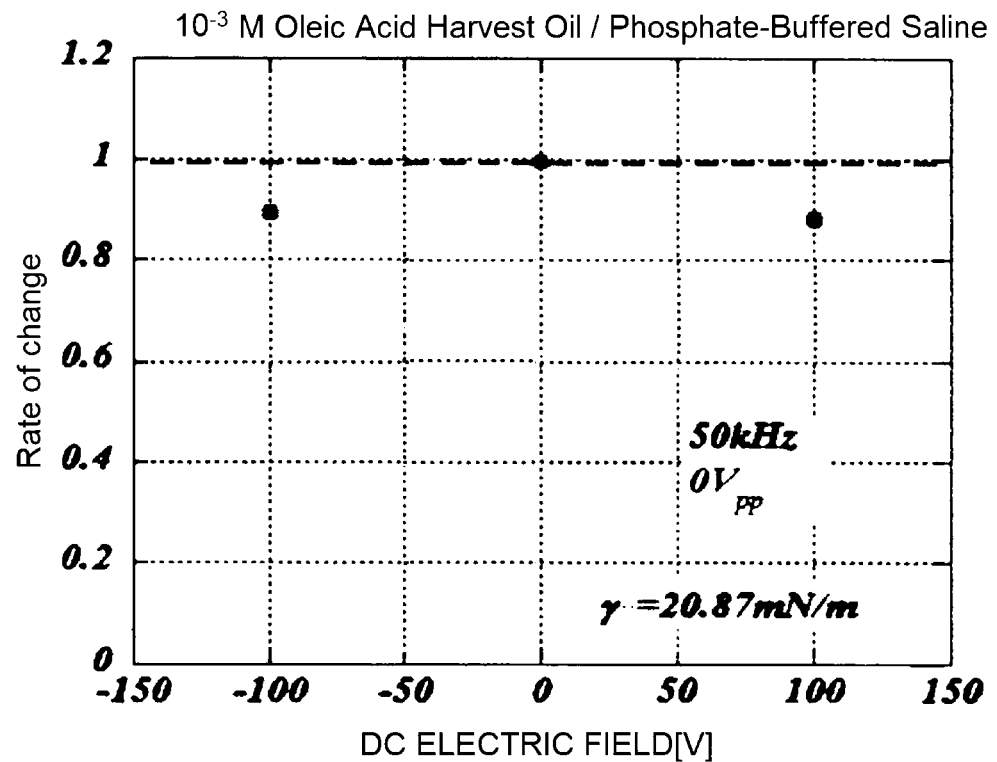
FIG. 5 is a graph showing measurement results of interfacial tension when only a DC electric field was applied to sodium oleate-added food oil with phosphate-buffered saline as a water phase.

FIG. 5 is a graph showing measurement results of interfacial tension when only a DC electric field was applied to sodium oleate-added food oil with phosphate-buffered saline as a water phase. Like the graphs shown in FIGS. 3B, 4A, and 4B, the abscissa axis of the graph in FIG. 5 represents the DC electric field [V] applied as an offset electric field, while the ordinate axis represents the rate of change of the interfacial tension due to the application of the electric field.

Figure 6:
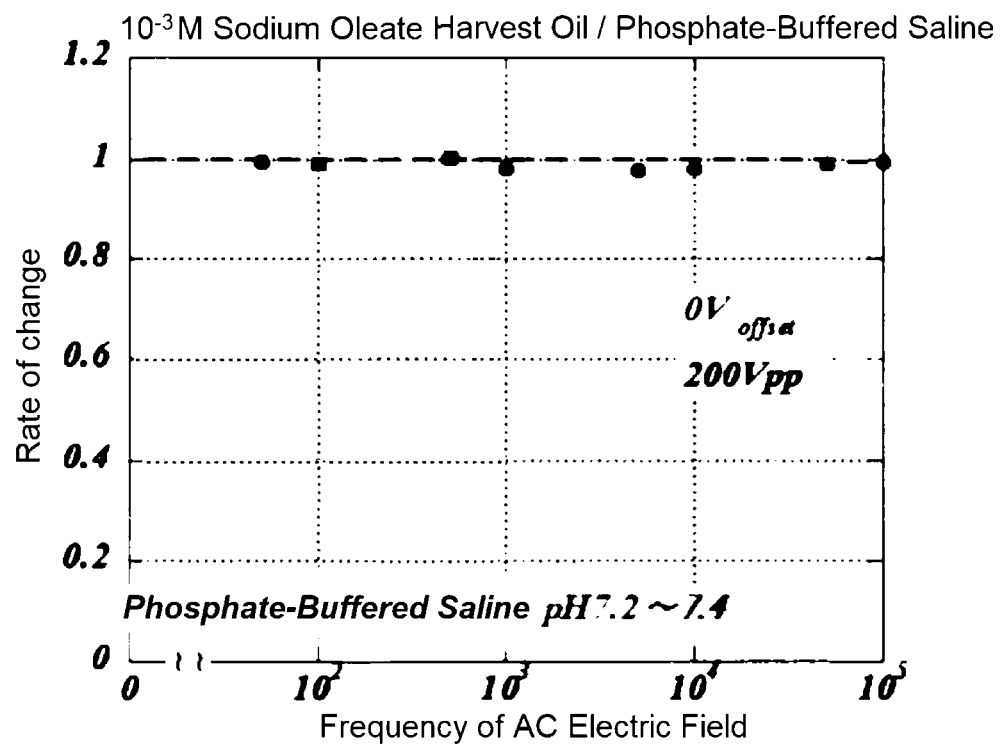
FIG. 6 is a graph showing measurement results of interfacial tension when only an AC electric field was applied to sodium oleate-added food oil with phosphate-buffered saline as a water phase.
Figure 7:
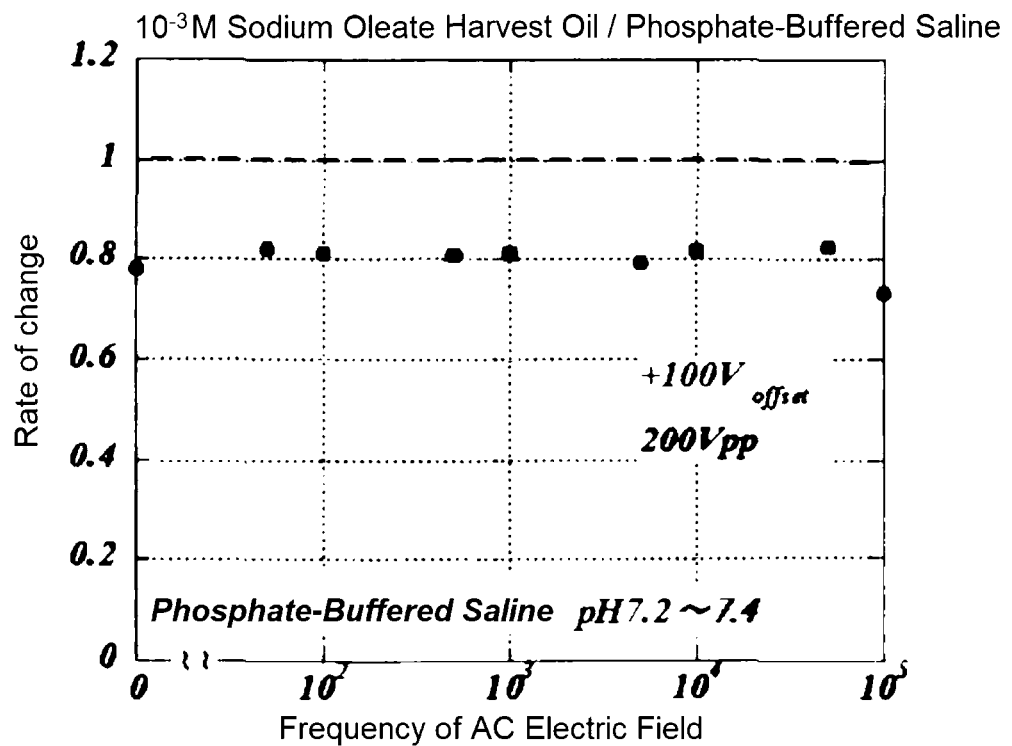
FIG. 7 is a graph showing measurement results of interfacial tension when a DC electric field of +100 V was applied, in an AC electric field, to sodium oleate-added food oil with phosphate-buffered saline as a water phase.

FIG. 6 is a graph showing measurement results of interfacial tension when only an AC electric field was applied to sodium oleate-added food oil with phosphate-buffered saline as a water phase. FIG. 7 is a graph showing measurement results of interfacial tension when a DC electric field of +100

Figure 8:
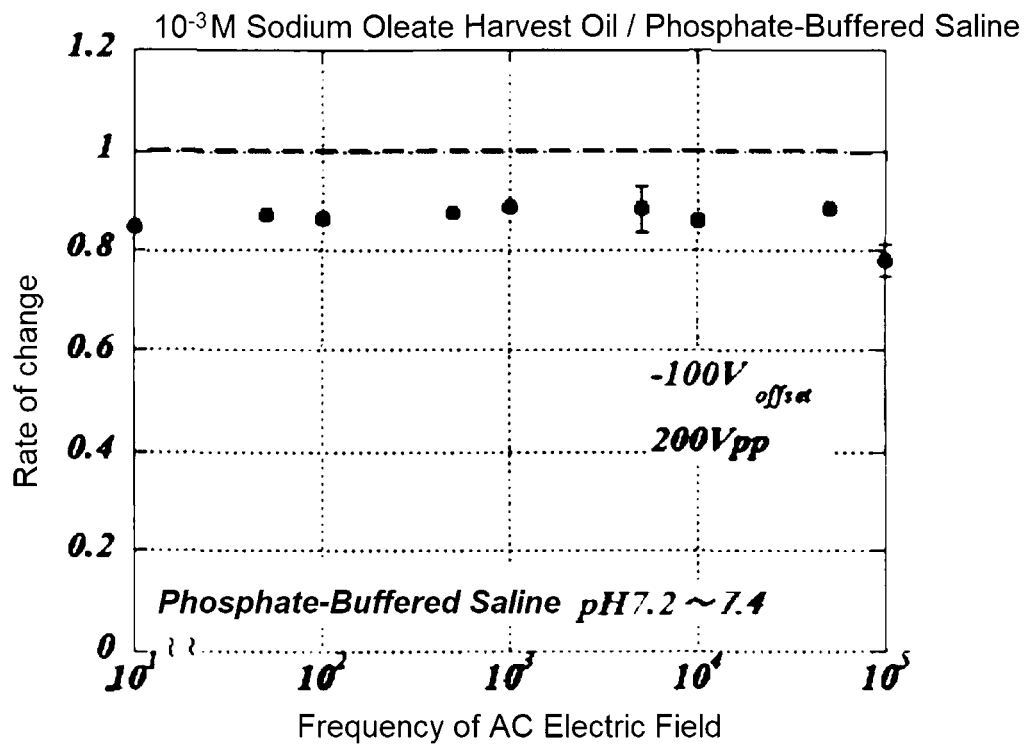
FIG. 8 is a graph showing measurement results of interfacial tension when a DC electric field of −100 V was applied, in an AC electric field, to sodium oleate-added food oil with phosphate-buffered saline as a water phase.

V was applied, in an AC electric field, to sodium oleate-added food oil with phosphate-buffered saline as a water phase. FIG. 8 is a graph showing measurement results of interfacial tension when a DC electric field of −100 V was applied, in an AC electric field, to sodium oleate-added food oil with phosphate-buffered saline as a water phase. The abscissa axes of the graphs shown in FIGS. 6 to 8 represent the frequency [Hz] of the AC electric field, while the ordinate axes represent the rate of change of the interfacial tension due to the application of the electric field.

As shown in FIG. 5, also when only a DC electric field of ±100 V was applied as an offset electric field without the application of an AC electric field, a decrease in interfacial tension was confirmed, like when a DC electric field of ±100 V was further applied as an offset electric field in the AC electric field. On the other hand, as shown in FIG. 6, when only an AC electric field was applied and no DC electric field was applied as an offset electric field, there was substantially no change in interfacial tension found even when the frequency of the AC electric field was varied.

However, as shown in FIG. 7, when a DC electric field of +100 V was applied as an offset electric field in the AC electric field of 200 Vpp at 50 Hz to 100 kHz, a decrease of about 20% in interfacial tension was confirmed regardless of the frequency of the AC electric field. Furthermore, as shown in FIG. 8, when a DC electric field of −100 V was applied as an offset electric field in the AC electric field of 200 Vpp at 50 Hz to 100 kHz, a decrease of a little over 10% in interfacial tension was confirmed regardless of the frequency of the AC electric field.

Next, measurement was made of the interfacial tension when an AC electric field of 200 Vpp at 50 kHz was applied to additive-free fresh food oil with saline of pH 5.4 to 5.6 as a water phase, and the interfacial tension when a DC electric field of ±100 V was further applied as an offset electric field in the above AC electric field.

Figure 3B:
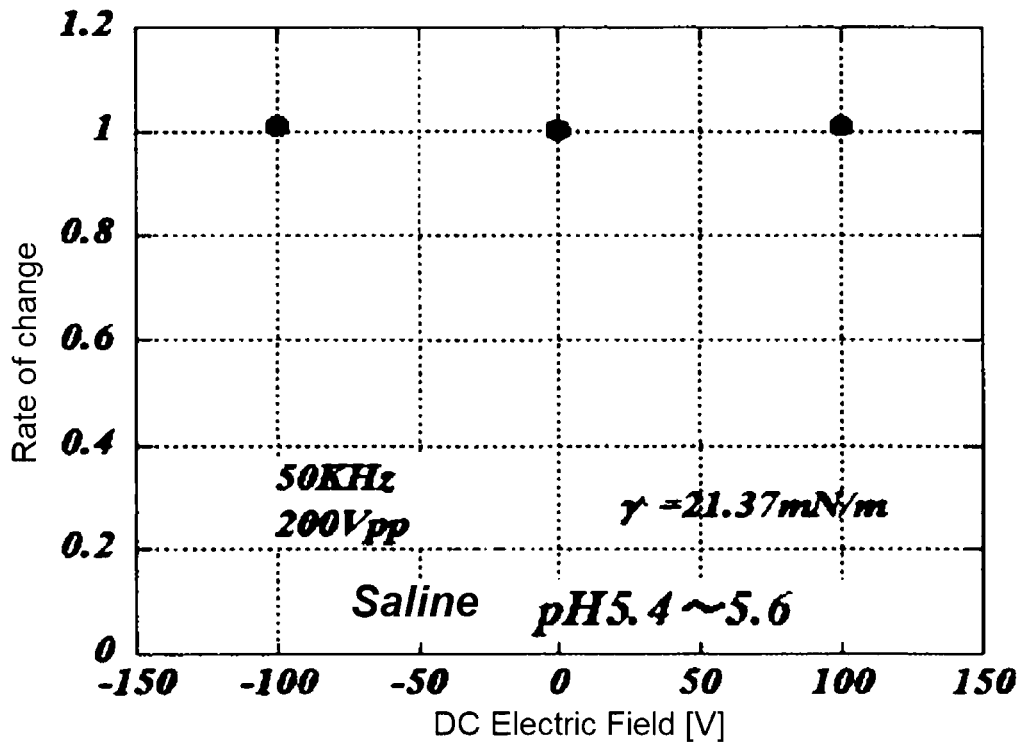

FIG. 3B is a graph showing measurement results of interfacial tension when an electric field was applied to additive-free fresh food oil with saline as a water phase. Like the graphs shown in FIGS. 3A, 4A, 4B, and 5, the abscissa axis of the graph in FIG. 3B represents the DC electric field [V] applied as an offset electric field, while the ordinate axis represents the rate of change of the interfacial tension due to the application of the electric field.

As shown in FIG. 3B, also in the case where saline was used as a water phase, like the case where phosphate-buffered saline was used as a water phase, there was substantially no change in interfacial tension found due to the application of the electric field when fresh food oil was free from additive.

Next, measurement was made of the interfacial tension when an AC electric field of 200 Vpp at 50 kHz was applied to saline as a water phase and $10^{-3}$ M sodium oleate-added fresh food oil, and the interfacial tension when a DC electric field of ±100 V was further applied as an offset electric field in the above AC electric field.

Figure 9:
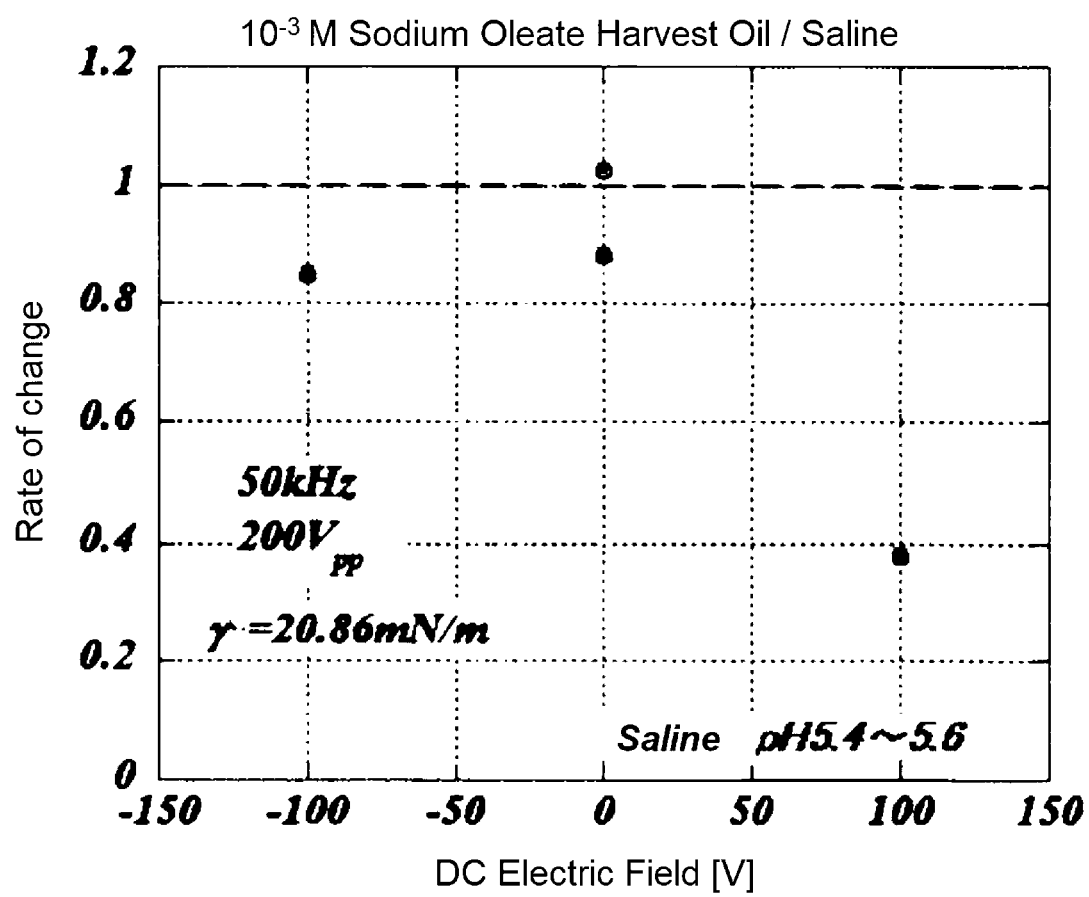
FIG. 9 is a graph showing measurement results of interfacial tension when an electric field was applied to sodium oleate-added food oil with saline as a water phase.

FIG. 9 is a graph showing measurement results of interfacial tension when an electric field was applied to sodium oleate-added food oil with saline as a water phase. Like the graphs shown in FIGS. 3A, 4A, 4B, 5, and 3B, the abscissa axis of the graph in FIG. 9 represents the DC electric field [V] applied as an offset electric field, while the ordinate axis represents the rate of change of the interfacial tension due to the application of the electric field.

As shown in FIG. 4B, in the case where phosphate-buffered saline was used as a water phase, even if $10^{-3}$ M sodium oleate was added to fresh food oil, there was substantially no change in interfacial tension found when only an AC electric field was applied. On the other hand, as shown in FIG. 9, in the case where saline was used as a water phase, it was confirmed that the interfacial tension was decreased a little over 10% by the addition of $10^{-3}$ M sodium oleate to fresh food oil even when only an AC electric field was applied. Although two plotted points are present as rates of change at 0 [V] on the abscissa axis in the graph shown in FIG. 9, one of them is the rate of change at 0 [V] on the abscissa axis of the graph shown in FIG. 4, which is given for reference.

When a DC electric field of +100 V was further applied as an offset electric field in the AC electric field, a decrease of over 60% in interfacial tension was confirmed. Furthermore, when a DC electric field of −100 V was further applied as an offset electric field in the AC electric field, a decrease of about 15% in interfacial tension was confirmed.

Next, in the case where saline was used as a water phase and $10^{-3}$ M sodium oleate was added to fresh food oil, measurement was made of interfacial tensions when AC electric fields at various frequencies were applied.

Figure 10:
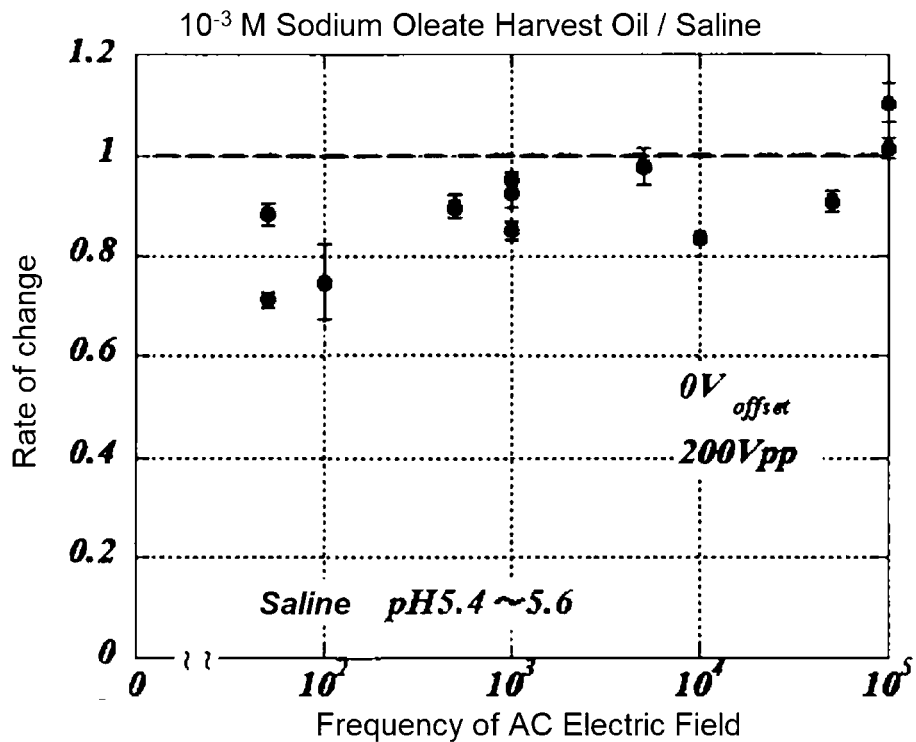
FIG. 10 is a graph showing measurement results of interfacial tension when only an AC electric field was applied to sodium oleate-added food oil with saline as a water phase.
Figure 11:
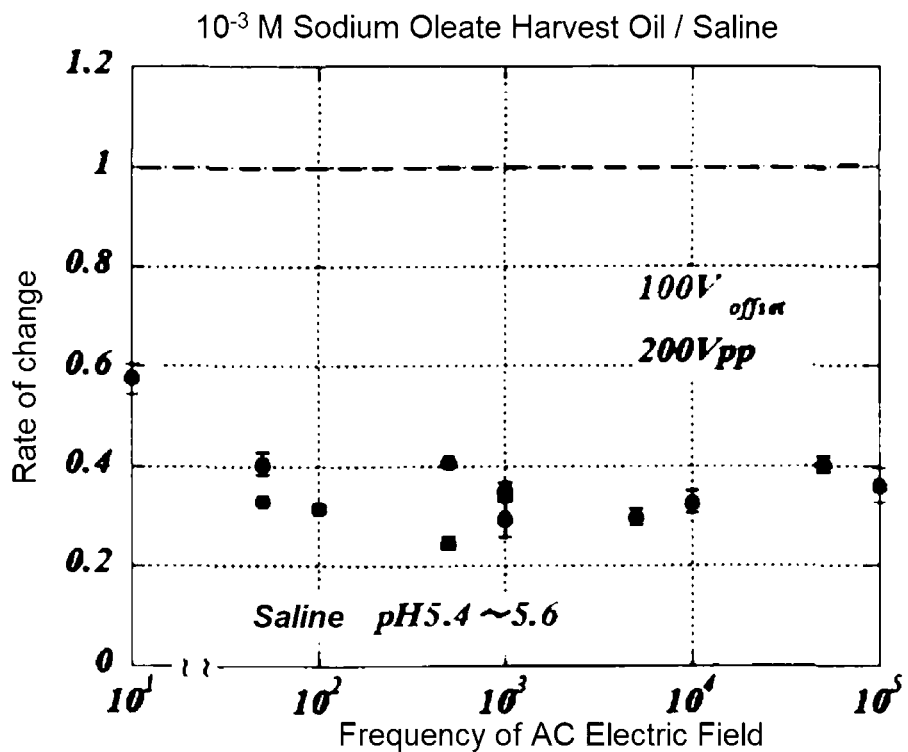
FIG. 11 is a graph showing measurement results of interfacial tension when a DC electric field of +100 V was applied, in an AC electric field, to sodium oleate-added food oil with saline as a water phase.
Figure 12:
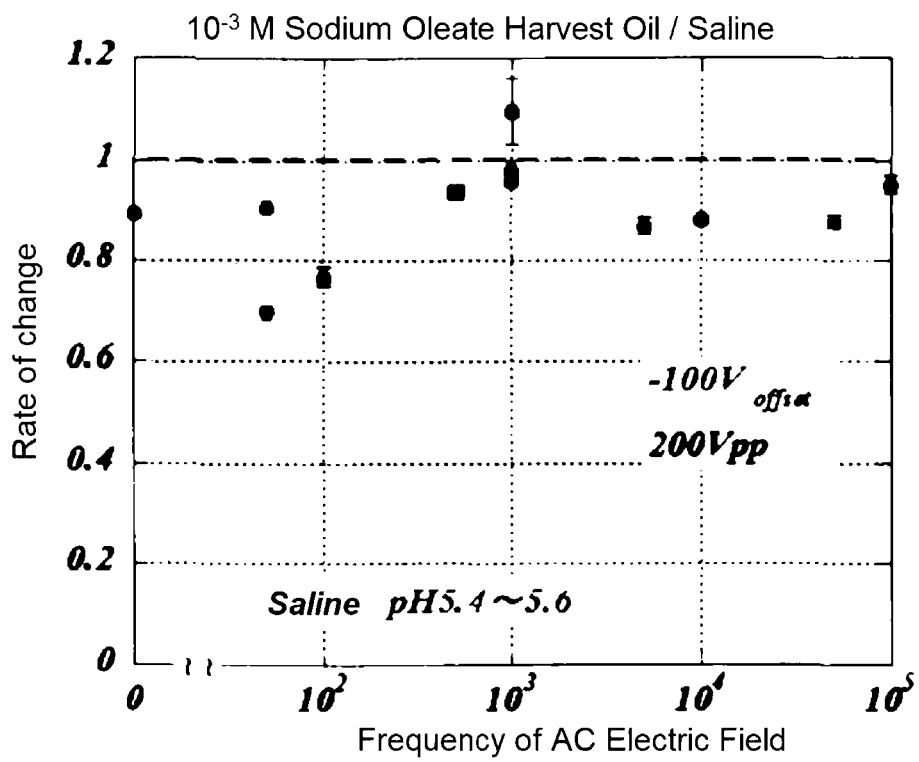
FIG. 12 is a graph showing measurement results of interfacial tension when a DC electric field of −100 V was applied, in an AC electric field, to sodium oleate-added food oil with saline as a water phase.

FIG. 10 is a graph showing measurement results of interfacial tension when only an AC electric field was applied to sodium oleate-added food oil with saline as a water phase. FIG. 11 is a graph showing measurement results of interfacial tension when a DC electric field of +100 V was applied, in an AC electric field, to sodium oleate-added food oil with saline as a water phase. FIG. 12 is a graph showing measurement results of interfacial tension when a DC electric field of −100 V was applied, in an AC electric field, to sodium oleate-added food oil with saline as a water phase. Like the graphs shown in FIGS. 6 to 8, the abscissa axes of the graphs in FIGS. 10 to 12 represent the frequency [Hz] of the AC electric field, while the ordinate axes represent the rate of change of the interfacial tension due to the application of the electric field.

As shown in FIG. 10, when only an AC electric field of 200 Vpp at 50 Hz to 100 kHz and 200 Vpp was applied and no DC electric field was applied as an offset electric field, the rate of decrease in interfacial tension tends to increase with decreasing frequency of the AC electric field although variations in interfacial tension value were found.

On the other hand, as shown in FIG. 11, when a DC electric field of +100 V was further applied as an offset electric field in the AC electric field, decreases of over 60% in interfacial tension were confirmed and the interfacial tension reached a minimum in the vicinity of 1 kHz. Furthermore, as shown in FIG. 12, when a DC electric field of −100 V was further applied as an offset electric field in the AC electric field, decreases of about 15% in interfacial tension were confirmed although variations in the rate of decrease in interfacial tension value were found, and the decrease in interfacial tension tends to be suppressed in the vicinity of 1 kHz.

The above measurement results of the interfacial tensions at the oil-water interfaces will be summarized as follows:

(a) as shown in FIG. 4A, even in the case where $10^{-3}$ M oleic acid was added to fresh food oil, there was substantially no change in interfacial tension found due to the application of the electric field;

(b) on the other hand, as shown in FIGS. 4B, 5 to 8, and 9 to 12, in the case where $10^{-3}$ M sodium oleate was added to fresh food oil, a decrease in interfacial tension was confirmed when an electric field was applied, and the rate of decrease in interfacial tension significantly depended on the pH of the water phase;

(c) as shown in FIGS. 4B and 5 to 8, in the case where phosphate-buffered saline of pH 7.2 to 7.4 was used as a water phase, there was no decrease in interfacial tension found when only an AC electric field was applied, while a decrease in interfacial tension was confirmed when a DC electric field was applied;

(d) on the other hand, as shown in FIGS. 9 to 12, in the case where saline of pH 5.4 to 5.6 was used as a water phase, a decrease in interfacial tension was confirmed even when only an AC electric field was applied and the rate of decrease in interfacial tension tends to increase with decreasing frequency of the AC electric field; and (e) furthermore, as shown in FIG. 11, in the case where saline of pH 5.4 to 5.6 was used as a water phase, a decrease of over 60% in interfacial tension was confirmed when a DC electric field of +100 V was applied as an offset electric field in an AC electric field, while, as shown in FIG. 12, the decrease in interfacial tension was only about 15% when a DC electric field of −100 V was applied as an offset electric field in the AC electric field.

It can be seen from the above measurement results that the lower the pH of water contained in food, the higher the rate of decrease in interfacial tension at the oil-water interface and the more bumping can be reduced.

Measurement of Interfacial Tension in Used Food Oil

Next, in the case where no additive was added to food oil used by the fryer 100, measurement was made of the interfacial tension when an AC electric field of 200 Vpp at 50 kHz was applied and the interfacial tension when a DC electric field of ±100 V was further applied as an offset electric field on the water phase side relative to the oil phase in the above AC electric field.

Figure 13:
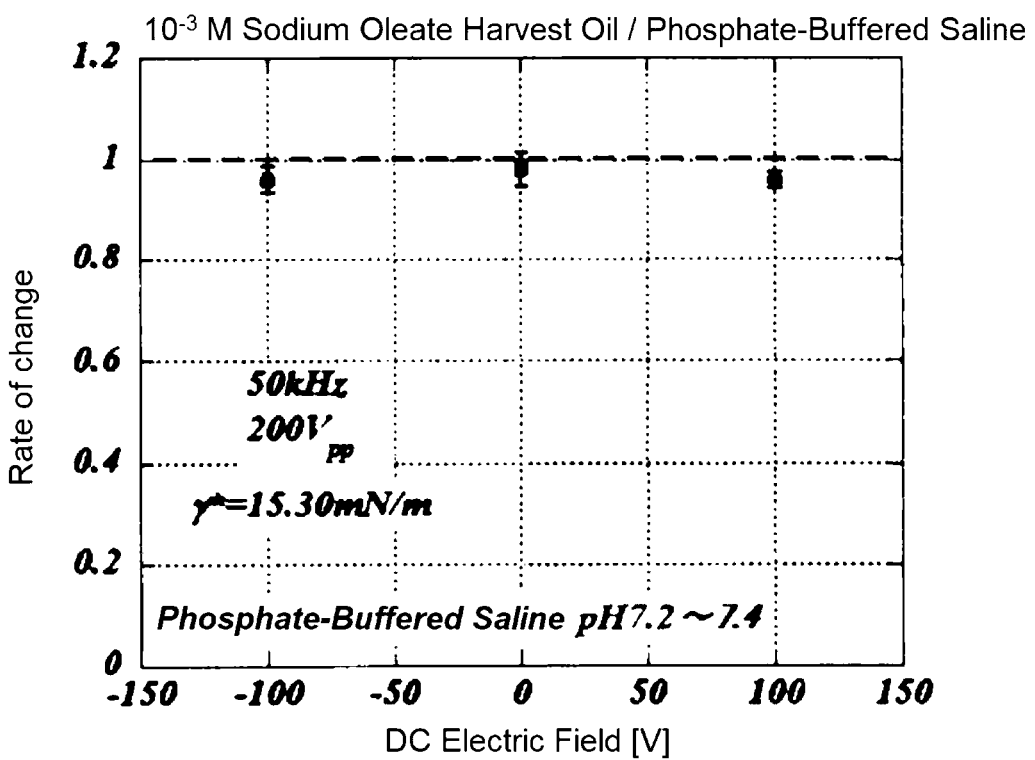
FIG. 13 is a graph showing measurement results of interfacial tension when an electric field was applied to additive-free used food oil with phosphate-buffered saline as a water phase.
Figures 14, 15:
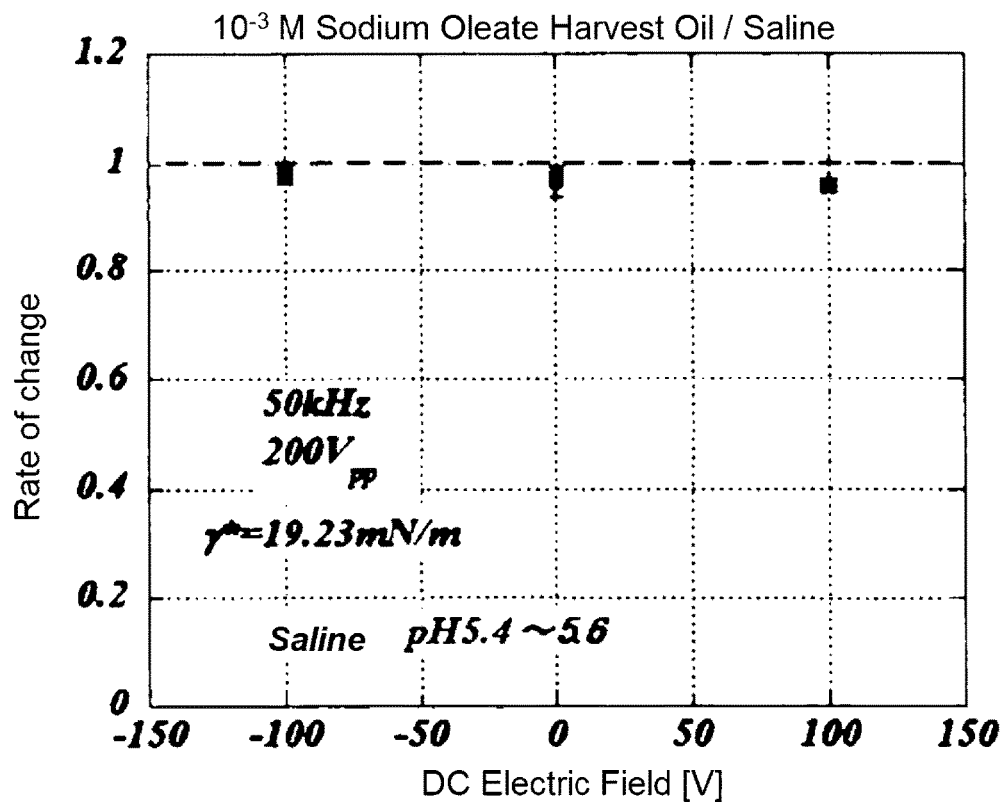
FIG. 14 is a graph showing measurement results of interfacial tension when an electric field was applied to additive-free used food oil with saline as a water phase.
FIG. 15 is a table showing observation results of W/O emulsions.

FIG. 13 is a graph showing measurement results of interfacial tension when an electric field was applied to additive-free used food oil with phosphate-buffered saline as a water phase. FIG. 14 is a graph showing measurement results of interfacial tension when an electric field was applied to additive-free used food oil with saline as a water phase. Like the graphs shown in FIGS. 3A, 3B, 4A, 4B, 5, and 9, the abscissa axes of the graphs in FIGS. 13 and 14 represent the DC electric field [V] applied as an offset electric field, while the ordinate axes represent the rate of change of the interfacial tension due to the application of the electric field.

As shown in FIGS. 3A and 3B, in the case where no additive was added to fresh food oil, there was substantially no change in interfacial tension found due to the application of the electric field. On the other hand, as shown in FIGS. 13 and 14, in the case where no additive was added to used food oil, it was confirmed that the interfacial tension was decreased slightly about 5% by the application of the electric field. Regarding the effect of the pH of the water phase, a similar tendency to the case where $10^{-3}$ M sodium oleate was added to fresh food oil was exhibited although the rate of decrease in interfacial tension was different from that in the above case.

EXAMPLE 2

In Example 1 above, it was confirmed that the presence of sodium oleate (salt of higher fatty acid), which may be produced by thermolysis or hydrolysis of food oil, caused a decrease in interfacial tension when an electric field was applied. A decrease in interfacial tension is due to an increase of interfacial polarization caused by the application of an electric field.

Oil-side oleate ions and water-side sodium ions adsorbed at the oil-water interface act to extend the interface owing to electrostatic repulsive energy acting between adjacent ions of the same kind. When the concentrations of oleate ions and sodium ions at the oil-water interface are increased by the application of an electric field, the distance between adjacent ions decreases, so that electrostatic repulsive energy, i.e., an action to extend the interface, increases. As a result, the interfacial tension, which is defined as work necessary to extend the oil-water interface by 1 m², decreases.

When water contained in food turns into water vapor in food oil, the size of water desorbing from the food to turn into tiny water droplets (hereinafter, referred to as "water microdroplets") in the food oil is smaller than the size (capillary tube diameter to 5 mm) of water droplets falling from a capillary tube in the sessile drop method. When such water microdroplets in food oil develop sufficient interfacial polarization to decrease their interfacial tension, pearl chains of the water microdroplets are formed by the dipole-dipole attraction. On the other hand, when the interfacial polarization is weak, no pearl chains of the water microdroplets are formed.

To evaluate the interfacial polarization state of water microdroplets in food oil (a water-in-oil (W/O) emulsion) based on the above viewpoints, microscopic observation was made on water microdroplets of each of (1) a phosphate-buffered saline of pH 7.2 to 7.4 conditioned by additive-free fresh food oil, (2) a saline of pH 5.4 to 5.6 conditioned by additive-free fresh food oil, (3) a phosphate-buffered saline of pH 7.2 to 7.4 conditioned by $10^{-3}$ M sodium oleate-added food oil, and (4) a saline of pH 5.4 to 5.6 conditioned by $10^{-3}$ M sodium oleate-added food oil, by applying electric fields of various voltages from 200 to 2000 Vpp/cm at 50 kHz to the water microdroplets (Example 2).

FIG. 15 is a table showing observation results of W/O emulsions. As shown in FIG. 15, in the $10^{-3}$ M sodium oleate-added food oil, the formation of such pearl chains as formed in FIG. 16 was confirmed, independent of the pH of the phosphate-buffered saline or saline contained in water microdroplets, about two minutes after the application of an AC electric field of 200 to 2000 Vpp/cm at 50 kHz. The size of formed pearl chains was approximately 200 μm and the diameter of each pearl was about 10 to about 100 μm. Once pearl chains were formed, they were held in that state for a week. On the other hand, in the additive-free fresh food oil, the formation of pearl chains was not confirmed about two minutes after the application of the AC electric field, but it was confirmed 40 minutes or more after the application of the AC electric field. This suggests that the $10^{-3}$ M sodium oleate-added food oil generated greater interfacial polarization at the water-oil interface than the additive-free fresh food oil. This results agree with the measurement results in Example 1 above.

Next, microscopic observation was made on water microdroplets of each of the above salines (1) to (4) two minutes after the application of various AC electric fields with various voltages of 200 to 2000 Vpp/cm at various frequencies of 50 Hz to 100 kHz to the water microdroplets.

Figures 16, 17A, 17B:
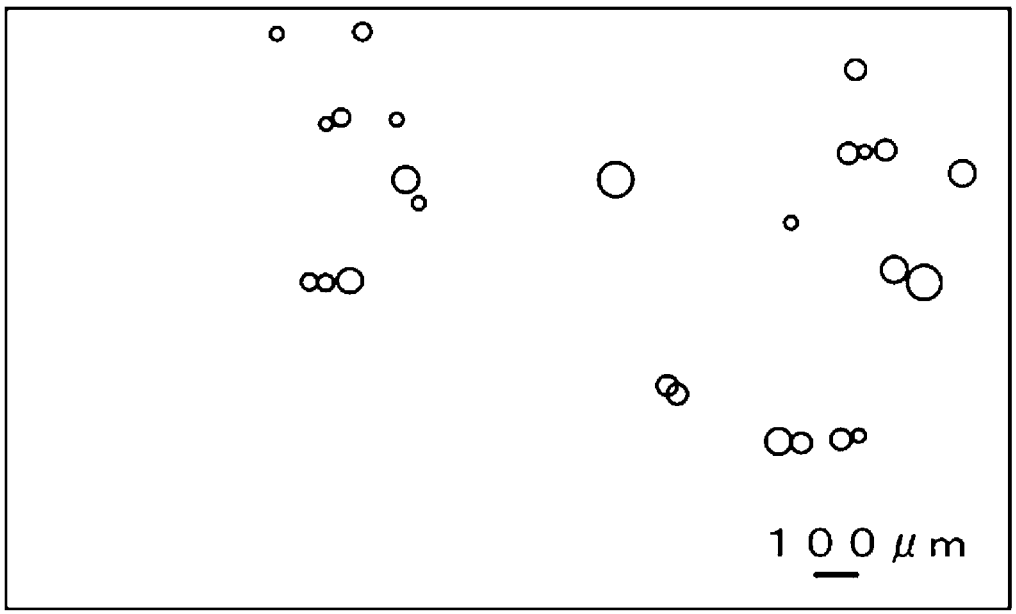
FIG. 16 is a schematic view showing the formation of pearl chains.
FIG. 17A is a table showing observation results of water microdroplets of phosphate-buffered saline to which various AC electric fields were applied in additive-free fresh food oil and FIG. 17B is a table showing observation results of water microdroplets of saline under the same conditions.

FIG. 17A is a table showing observation results of water microdroplets of phosphate-buffered saline to which various AC electric fields were applied in additive-free fresh food oil and FIG. 17B is a table showing observation results of water microdroplets of saline under the same conditions. FIG. 18A is a table showing observation results of water microdroplets of phosphate-buffered saline to which various AC electric fields were applied in $10^{-3}$ M sodium oleate-added food oil and FIG. 18B is a table showing observation results of water microdroplets of saline under the same conditions.

As shown in FIGS. 17A and 17B, in the fresh food oil, there was no formation of pearl chains of water microdroplets found at any of the frequencies. On the other hand, as shown in FIGS. 18A and 18B, in the $10^{-3}$ M sodium oleate-added food oil, the formation of pearl chains of water microdroplets was confirmed within a range of 500 to 2000 Vpp/cm at any of the frequencies. However, at low frequencies in the above frequency range, the formation of pearl chains could not be confirmed because of disturbance of fluid motion attributed to electroosmotic flow.

It can be seen from the above observation results that even water microdroplets with a diameter of 100 μm or less dispersed into food oil develop interfacial polarization at the water-oil interface by the application of an electric field and the interfacial polarization at the water-oil interface is increased by the addition of $10^{-3}$ M sodium oleate to the food oil to decrease the interfacial tension.

Food contains a large amount of polar ingredients, besides fatty acid salts, such as sodium oleate. Food also contains a large amount of polar organic polymers. For example, water contained in large amounts in food is one of polar molecules. In food of plant or animal origin, water is contained in an amount of about 70% and the cell membrane of the food is formed of a lipid bilayer membrane. Specifically, fruits and vegetables contain water constituting 80% or more of their weight and fishes and meats contain water constituting 70 to 80% of their weight. If 5% water in a vegetable or 3% water in fish or meat is lost, its freshness and quality cannot be maintained.

Although water, which is one of polar molecules, is contained in large amounts in food, it is broadly divided into "bound water" and "free water" according to its state of being. "Bound water" is water bound by hydrogen bonding to and hydrated with protein and carbohydrate in food and is stable because its molecular motion is constrained by the hydration. "Free water" is water that is freely movable and can therefore freeze at 0° C., vaporize near 100° C. or dissolve substances. As food contains a larger amount of free water, the food can be said to be fresher, or juicier. However, its molecule has a polarity and is therefore easily bindable to other molecules. Microorganisms, such as putrefying bacteria, cannot be bound to bound water already bound to food ingredients and, therefore, bound water cannot be used for their growth. On the other hand, microorganisms can be bound to free water and, therefore, free water can be used for their growth. Free water bound to microorganisms causes rot.

In the water control method according to this embodiment, droplets of free water are turned into a stable state of a pearl-chain structure, like bound water, so that surplus water can be prevented from leaking from food into food oil, thus maintaining the juiciness of the food.

Furthermore, an enormous amount of energy (vaporization heat) is necessary when water breaks hydrogen bonding to change from a liquid to a gas. In the water control method according to this embodiment, water contained in food is held in a liquid phase by the formation of pearl chains and not vaporized in food oil. Thus, good effects can be obtained, including prevention of oil splash due to water in the food, decreased oil temperature during cooking, decreased food cooking time, and its attendant reduction of food oil oxidation.

As described previously, the fryer 100, which is the ingredient control device according to this embodiment, includes a pair of opposed plate antennas 102 which are the electrodes forming the vibration generating portion capable of generating vibrations. The fryer 100 controls water which is an ingredient of food as the object placed between the pair of opposed plate antennas 102, to be more specific, the water activity of the food, by generating electromagnetic waves (radio waves) at a frequency of approximately 10 kHz to approximately 500 kHz between the pair of opposed plate antennas 102.

In the water control method using the fryer 100 according to this embodiment, the fryer 100 applies a DC electric field of +100 V as an offset electric field on the water phase side relative to the oil phase, which is the other phase, in an AC electric field to irradiate food with electromagnetic waves at a frequency of 50 kHz. Thus, the interfacial polarization between the water phase and the oil phase can be increased to decrease the interfacial tension between the water phase and the oil phase by approximately 60% and bind water in a pearl-chain structure. Water contained in food is divided into bound water and free water. Free water in water contained in food becomes bound in a pearl-chain structure, so that the water activity representing the proportion of free water in food can be decreased.

When the interfacial tension between the water phase and the oil phase is decreased by approximately 60% in the above manner, water contained in the food is likely to be desorbed from the food and dispersed in the form of water droplets in the food oil. Therefore, even if the water in the food turns into vapor and gasifies in the food oil being heated, only minor bumping occurs. By controlling water contained in food in this manner to reduce bumping, good effects, including prevention of oil penetration into the food, can be obtained. Coupled with this, the cooked food has very good eating quality.

Furthermore, since droplets of free water are bound together in a pearl-chain structure and thus turned into a stable state, surplus water can be prevented from leaking from food into food oil, thus maintaining the juiciness of the food. Moreover, in the water control method according to this embodiment, water contained in food is held in a liquid phase by the formation of pearl chains and not vaporized in food oil. Thus, good effects can be obtained, including prevention of oil splash due to water in the food, decreased oil temperature during cooking, decreased food cooking time, and its attendant reduction of food oil oxidation.

As thus far described, the fryer 100 and the water control method both according to this embodiment can improve food containing water to a better state.

The present invention is not limited to the above embodiment and various modifications and applications can be made therein. A description will be given below of modifications of the above embodiment which are applicable to the present invention.

Although the description of the above embodiment was given by taking water as an example of the ingredient, the present invention is not limited to this and the ingredient may be anything controllable by vibrations, such as other kinds of liquids.

Although the description of the above embodiment was given by taking a fryer as an example of the ingredient control device, the present invention is not limited to this and the ingredient control device may be anything that can control an ingredient of an object, such as food. Examples of the ingredient control device include a freezer, a container, and a warehouse which can control the water activity of food. Specifically, by controlling the water activity of food using the ingredient control device according to the present invention, the taste, flavor, and nutrition of the food can be improved.

When water contained in meats, fishes, vegetables, and fruits serving as foods is bound in a pearl-chain structure using the ingredient control device according to the present invention, even normal freezers can keep the qualities of the meats, fishes, and so on for a long period of time (several times as long as usual) without rotting them. In fact, when a crimson sea-bream was irradiated with an electric field for an hour by the ingredient control device and then preserved in a freezer for two days, the freshness of the fish could be maintained two days longer than when a crimson sea-bream was irradiated with an electric field for only 15 minutes and then preserved in the freezer for two days and when a crimson sea-bream was preserved in the freezer for two days without being irradiated with an electric field.

Although the description of the above embodiment was given by taking food as an example of the object, the present invention is not limited to this and the object may be anything an ingredient of which can be controlled by vibrations, such as electromagnetic waves. Examples of the object include beverages, plants other than foods, such as plants for use in drugs, human bodies, animals, gunpowder, drugs, such as vaccines, and water itself.

Specifically, by controlling the water activities of beverages, plants, human bodies, animals, gunpowder or drugs, such as vaccines, using the ingredient control device according to the present invention, not only foods but also beverages, plants, human bodies, animals, gunpowder, drugs, and so on can become difficult to degrade or rot.

Furthermore, crops cultivated using water decreased in interfacial tension by the ingredient control device according to the present invention can germinate and grow very fast and uniformly, suppress the growth of algae and weeds, and provide very good eating qualities.

When using the ingredient control device according to the present invention free water in a living organism is changed from a state where it has already been bound to active oxygen, viruses, microorganisms including bacteria, or the like to a pearl-chain structure of water droplets, the free water is released from hydrogen bonds with active oxygen, viruses, microorganisms including bacteria, or the like and thus can exert a significant therapeutic effect. Although conventional drug research and development is carried out on the assumption of a state of free water where it has already been bound to active oxygen, viruses, microorganisms including bacteria, or the like, the present invention can undermine this assumption itself and thus improve the therapeutic effect. Furthermore, when the ingredient control device according to the present invention is contained in a cellular phone, a smartphone, a tablet computer, a personal computer, a chair, a bed or a pillow, free water bound to microorganisms including bacteria, active oxygen, viruses or the like is separated therefrom and droplets of the free water are bound together in a pearl-chain structure. Thus, the activity of microorganisms including bacteria, active oxygen, viruses or the like can be terminated, stopped or deactivated.

When in mixing cement with water the water to be mixed into the cement is turned into a pearl-chain structure using the ingredient control device according to the present invention, the strength of the resultant concrete can be increased. When water used in a refining process for iron or resin is turned into a pearl-chain structure using the ingredient control device according to the present invention, the strength of iron or resin can be increased, so that defects can be reduced. When in a production process of semiconductor device-related products, such as wafers for LSI (large-scale integration) devices and liquid crystal displays, cleaning water for substrates is turned into a pearl-chain structure using the ingredient control device according to the present invention, the cleaning effect can be increased. With the use of the water control method according to the present invention, the production technique for dilutional preparation of an etching liquid can be improved and the resolution of fine patterns to be printed in an exposure process can be increased. When water contained in ink or paint is turned into a pearl-chain structure using the ingredient control device according to the present invention, nozzle clogging can be reduced.

With the use of the ingredient control device according to the present invention, the effect of cleaning test devices for precise quantitative analysis can be increased and problems with the preparation of reagents and standards, blanks, solvents for two-phase extraction, and so on can be solved. Furthermore, the ingredient control device according to the present invention can be used for cell culture in the biotechnology field, such as genetic engineering, particularly for DNA (deoxyribonucleic acid) amplification. The ingredient control device according to the present invention can also be applied to water for drug injection during the production of injectables (exclusive of water for dilution or as a solvent during inoculation) and sealed purified water.

The ingredient control device according to the present invention can be applied to condensate demineralization of ultrahigh-pressure boilers in thermal power plants where supercritical water is totally evaporated and traditional boilers. Furthermore, although primary cooling water coming into contact as a coolant with the core of a light-water reactor of a nuclear power plant brings secondary radioactivity due to radioactivation of impurities, particularly, nuclide having a large reaction cross-section, such as boron and cadmium, the ingredient control device according to the present invention can be used to prevent the secondary radioactivity. Moreover, also in solar power generation and hydrogen power generation, the efficiency of electric power generation can be increased by using the ingredient control device according to the present invention to eliminate impurities in solvents and thus make highly pure water.

The ingredient control device according to the present invention can also be applied to media for specialized particle detectors in particle physics. Furthermore, when, also in molecular structures of gasoline and heavy oil, free water is turned into a pearl-chain structure using the ingredient control device according to the present invention, the fuel combustion efficiency can be increased.

When the ingredient control device according to the present invention is applied to ultrapure water, the electric conductivity of the ultrapure water can be increased.

The principal features of the present invention can be employed in various embodiments and variations without departing from the broad spirit and scope of the invention. The embodiment described above is merely illustrative of an example of the present invention and does not limit the scope of the invention.

What is claimed is:

1. An ingredient control method using an ingredient control device including at least one vibration generating portions portion capable of generating vibrations, wherein the vibration generating portion is at least one electrode capable of generating electromagnetic field directed toward an object, the method comprising:

(1) selecting a voltage value of the voltage applied from a range of 0 to 2,000 Vpp/cm and by selecting a frequency of the alternating current component of the voltage from a range of 0 Hz to 500 kHz corresponding to relationships between pH of a water phase in the object placed opposite to the electrode, and a rate of change in an interfacial tension between the water phase and another phase in the object, (2) controlling the electromagnetic field generated by the electrode based on the voltage value and the frequency of the voltage applied to the electrode, (3) selecting the voltage value and the frequency of the voltage applied to the electrode to adjust the interfacial tension between the water phase and the another phase in the object to target state according to the pH of the water phase in the object, by considering rate of change in the interfacial tension between the water phase and the another phase in the object with respect to the voltage value and the frequency of the voltage applied to the electrode, depending on the pH of the water phase in the object, based on characteristics of the rate of change in the interfacial tension between the water phase in the object with respect to the pH of the water phase in the object placed opposite the electrode, and the voltage value and the frequency of the voltage applied to the electrode, and (4) controlling the interfacial polarization between the water phase and the another phase in the object disposed opposite the electrode, controlling the interfacial tension between the water phase and the another phase in the object, and controlling to bind the water in the object into a pearl chain structure by applying the voltage with the selected voltage value and the frequency to the electrode and by controlling the electromagnetic field generated by the electrode.

2. The ingredient control method according to claim 1, wherein the vibration generating portions generates the electromagnetic field from the electrodes to increase interfacial polarization between the water phase of the object and the other phase and thus decrease the interfacial tension between the water phase and the other phase and bind water in the object into a pearl-chain structure.

3. The ingredient control method according to claim 1, wherein the DC voltage of approximately +100 V is applied to the electrode as an offset voltage on the water phase side relative to the other phase in the AC voltage to increase the interfacial polarization between the water phase of the object and the other phase and thus decrease the interfacial tension between the water phase and the other phase and bind the water in the object into a pearl-chain structure.

4. The ingredient control method according to claim 1, wherein the electromagnetic field have a frequency of approximately 10 KHz to approximately 500 kHz.

5. The ingredient control method according to claim 4, wherein the electromagnetic field includes low-frequency electromagnetic waves.

6. The ingredient control method according to claim 1, wherein the water in the object is divided into bonded water and free water and the free water in the object is bound in a pearl-chain structure.

7. The ingredient control method according to claim 1, wherein a water activity of the object is controlled by generating electromagnetic waves from the electrode, the vibration generating portion generate electromagnetic waves between the electrodes to increase interfacial polarization between the water phase of the object and the other phase and thus decrease the interfacial tension between the water phase and the other phase and bind water in the object into a pearl-chain structure.

* * * * *